June 27, 1967  A. L. TUREK  3,327,989

VALVE WITH SNUBBER

Filed Feb. 27, 1964

INVENTOR.
Anton L. Turek,
BY
Attys.

United States Patent Office 3,327,989
Patented June 27, 1967

3,327,989
VALVE WITH SNUBBER
Anton L. Turek, Cicero, Ill., assignor to Imperial-Eastman Corporation, a corporation of Illinois
Filed Feb. 27, 1964, Ser. No. 347,830
2 Claims. (Cl. 251—120)

ABSTRACT OF THE DISCLOSURE

The disclosure is of a gauge valve provided with a snubber in the inlet passage which is freely movable therein both axially and transversely of the passage and is adapted to engage the valve member in any one of a plurality of different positions as a result of fluid flow through the valve and to be moved by the movable valve member to a recessed position when the valve is closed. The valve body defines a positive stop for positioning the snubber in the recessed position.

---

Figure 1:
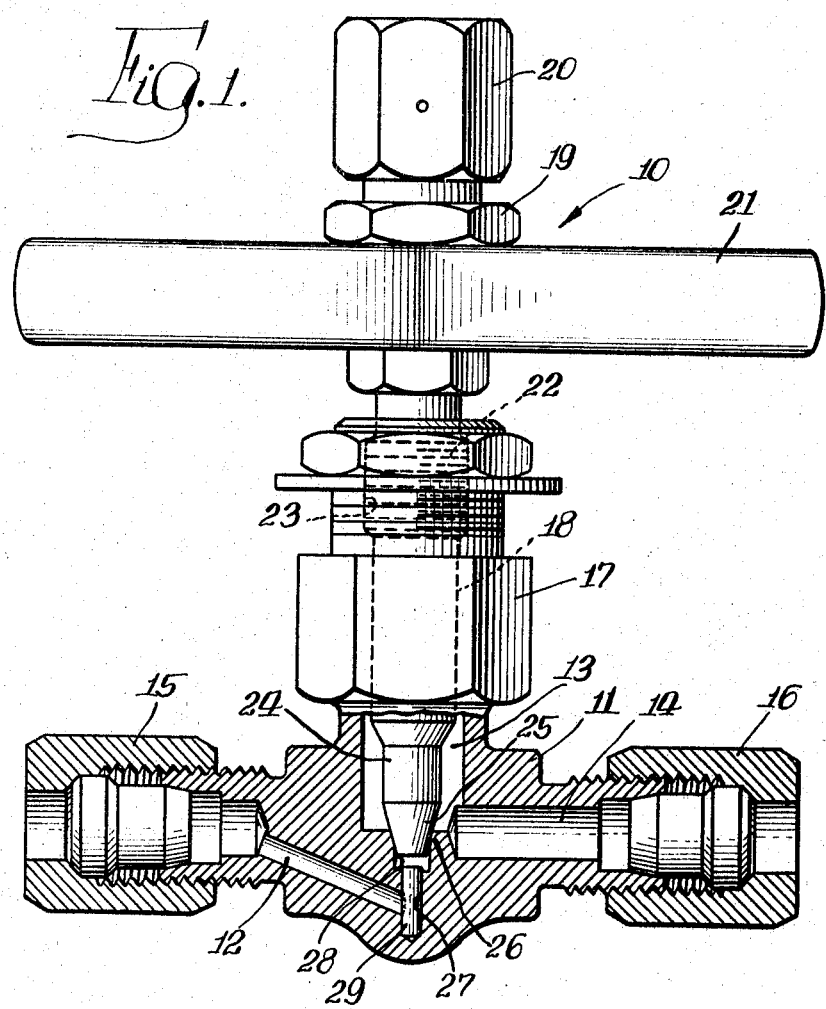

This invention relates to valves and in particular to valves such as gage valves wherein it is desirable to snub pressure variations to preclude damage to associated equipment such as gages.

In the conventional form of gage valve, means are provived for selectively connecting a reference gage to the valve so as to check the accuracy of the working gage connected to the line. In opening and closing the valve as well as during normal use of the fluid line, pressure variations or surges may occur. The present invention is concerned with the problem of reducing the effect of these pressure variations so as to preclude damage to the gages or like apparatus connected to the valve resulting from such pressure surges.

One solution to the problem heretofore has been to provide in the fluid line a constriction or restricted opening which acts as a shock absorber or snubber effectively precluding the transmission of pressure surges therethrough. Such restrictions in the flow passage, however, have been found to present a further problem as they tend to become clogged thereby stopping or at least undesirably decreasing the fluid flow therethrough.

In one form of shock absorber or snubber, a cylindrical rod-like element is disposed within a cylindrical passage having a relatively small clearance therebetween to define the restricted flow opening providing the snubbing action. It has been found, however, that such pin or rod snubbers tend to become frozen in the bores, either by cocking or as a result of the collection of clogging material. One solution to this problem has been to provide weights on the upper end of such snubber pins which when the fluid flow through the device is terminated act to move the snubber pin downwardly under the action of gravity in opposition to the movement of the pin effected by the fluid flow, thereby providing a self-cleaning and self-returning action to the snubber.

Even with such weights attached to the snubber pins, it has been found that the snubbers of the art tend to become frozen from the above-described cocking or clogging actions so that such snubber devices have not heretofore proven satisfactory. The present invention comprehends an improved form of snubber which eliminates the above discussed disadvantages of the known snubbers in a novel and simple manner.

Thus, a principal object of the present invention is the provision of a new and improved snubber device.

Another object of the invention is the provision of such a snubber device in association with a valve wherein the movable means of the valve is associated with the snubber in such a way as to obtain positive movement of the snubber pin in a direction opposite to that effected by the flow of fluid therethrough so as to provide effectively positive self-cleaning and hang-up free functioning of the snubber.

A further object of the invention is to provide in a valve having a body defining a valve chamber, and a passage for delivering fluid to the chamber, structure for controlling fluid delivery to the chamber comprising, snubber means movably disposed in the passage for snubbing flow of fluid therethrough to the chamber, the snubber being movable in a first direction as a result of fluid flow through the passage, valve means for selectively permitting and preventing communication between the passage and chamber, and means operatively associated with the valve means and snubber means for positively moving the snubber means in a direction opposite to the first direction as a result of operation of the valve means to prevent communication between the passage and chamber.

Figure 2:
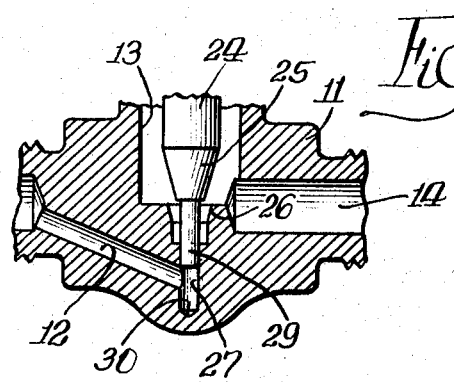

Other objects and advantages of the invention will be apparent from the following description taken in connection with the accompanying drawing wherein:

FIGURE 1 is a diametric vertical cross-section of a valve having a snubber structure embodying the invention, with portions of the valve shown in side elevation; and FIGURE 2 is a fragmentary diametric section illustrating a portion of the valve with the snubber as disposed during fluid flow therethrough.

In the exemplary embodiment of the invention as disclosed in the drawing, a valve generally designated 10 is shown to comprise a body member 11 defining an inlet flow passage 12, a valve chamber 13, and an outlet flow passage 14. The valve is provided with an inlet fitting 15 for use in connecting a suitable supply conduit (not shown) thereto for communication with the inlet passage 12, and is provided with an outlet fitting 16 for connecting a gage or the like (not shown) to the body in communication with the outlet passage 14. A bonnet 17 is connected to the valve body and carries a hollow valve stem 18 which extends upwardly therefrom to a test connector 19 which is normally closed by a closure cap 20. The valve stem carries an operating handle 21 for rotating the valve stem, whereby a threaded portion 22 of the valve stem may be threadedly advanced through a threaded bore portion 23 in the bonnet to effect a reciprocal movement of a valve member 24 carried at the lower end of the valve stem and disposed within valve chamber 13. The valve member includes a seating portion 25 adapted to selectively be seated on and be spaced above an annular seat surface 26 in the valve body at the lower end of valve chamber 13. A first cylindrical passage 27 extends from inlet passage 12 to a second, radially enlarged cylindrical passage 28 opening through valve seat 26 in axial alignment with the stem 18. Thus, when the valve portion 25 is spaced above the valve seat 26, fluid flow is permitted from inlet passage 12 to valve chamber 13 and thence through outlet passage 14 for actuation of the device which is connected thereto.

Herein, valve 10 comprises a gage valve, and, thus, the device normally connected to the outlet passage 14 by connector 16 may comprise a gage. At times it is desired to calibrate or check the functioning of the gage connected to the outlet passage 14 and for this purpose a test gage (not shown) is connected to the upper end of the stem by removing the closure cap 20 and connecting the calibrating gage to the upper end of the hollow stem for receiving fluid pressure from the valve chamber 13 when the valve is opened.

To snub pressure surges from the supply line, a snubber pin or rod 29 is disposed within the lower cylindrical passage 27 in axial alignment with the stem. The snubber pin has a small clearance with the body in the passage 27 to provide a small flow passage which effectively acts as a shock absorber preventing transmission of pressure surges to the fluid in valve chamber 13, and, thus, to the gages connected to the valve.

In the illustrated embodiment, the snubber pin has a clearance with the body of approximately .0005 inch to .0022 inch. Illustratively, the snubber pin may be formed of conventional needle bearing rod material having an outer diameter tolerance of approximately .0002 inch.

When the valve portion 25 is cracked from the valve seat 26, the pressure differential causes a movement of the rod 29 upwardly against the bottom of the stem portion 25 thereby effecting a self-cleaning action between the snubber rod 29 and the sides of the passage 27. When the valve is closed to seat the valve portion 25 on body seat portion 26, the valve portion 25 positively engages the upper end of the rod 29 forcing it back downwardly in a direction opposite to the movement effected by the opening of the valve, thereby effectively positively precluding hang-up of the snubber pin 29 and assuring a self-cleaning movement of the pin during each cycle of operation of the valve.

The passage 27 terminates at its lower end 30 slightly below the inlet flow passage 12 whereby the passage end 30 defines a stop limiting the downward movement of the pin 29 to position the pin in the path of flow of the fluid flowing from the inlet passage 12 to the chamber 13. The passage end 30 is spaced sufficiently below the valve seat 26 to provide a clearance between the upper end of the pin 29 and the valve portion 25 when the valve is seated on valve seat 26 and the pin is resting on the stop end portion 30 of the passage 27. As the self-cleaning functioning of the snubber effectively precludes hang-up of the pin 29, the pin is returned to the position of FIGURE 1 subsequent to each operation of the valve, thereby providing a limited free movement of the pin independently of the valve in each cycle of operation of the valve.

The snubber device hereof is adapted for use under pressures varying over a substantial range such as from 200 p.s.i. up to over 6500 p.s.i. gage pressure. The snubber is extremely simple and economical of construction, while yet it affords the effectively positive foolproof snubbing action eliminating the vexatious hang-up and clogging problems of the snubbers heretofore found in the art.

While I have shown and described one embodiment of my invention, it is to be understood that it is capable of many modifications. Changes, therefore, in the construction and arrangement may be made without departing from the spirit and scope of the invention as defined in the appended claims.

I claim:
1. In a valve having a body defining a valve chamber having an opening therein forming a valve seat, and a cylindrical passage for delivering fluid through said valve seat to said chamber, structure for controlling fluid delivery to said chamber comprising:

means defining an inlet passage opening transversely into said cylindrical passage; cylindrical snubber means axially and transaxially freely movably disposed in said passage and having a small annular clearance therewith for snubbing flow of fluid therethrough to said chamber at a point spaced substantially from said valve seat, said snubber means being movable in a first axial direction as a result of fluid flow through said passage and transaxially as a result of fluid flow from said inlet passage into said cylindrical passage, said snubber means having a length of the order of the length of said cylindrical passage;

axially movable, transaxially fixed valve means engageable with said valve seat for selectively permitting and preventing communication between said passage and said chamber; and separable means operatively associated with said valve means and snubber means for limiting movement of said snubber means relative to said valve means in said first direction and positively moving said snubber means in an axial direction opposite to said first direction as a result of operation of said valve means to prevent communication between said passage and said chamber.

2. The valve structure of claim 1 wherein said snubber means is arranged to be displaced from adjacent said inlet passage to provide an unobstructed opening of said inlet passage into said cylindrical passage upon commencement of fluid flow through said valve.

References Cited

UNITED STATES PATENTS

| | | | |
|---|---|---|---|
| 1,042,568 | 10/1912 | Laidley | 251—37 |
| 2,324,402 | 7/1943 | Kocher | 251—120 X |
| 2,531,479 | 11/1950 | Southern et al. | 251—120 |
| 2,991,795 | 7/1961 | Fraser et al. | 251—121 X |

FOREIGN PATENTS

| | | |
|---|---|---|
| 154,413 | 12/1953 | Australia. |
| 814,986 | 6/1959 | Great Britain. |

ALAN COHAN, *Primary Examiner.*

M. CARY NELSON, *Examiner.*

R. C. MILLER, *Assistant Examiner.*